United States Patent
Xu

(10) Patent No.: US 9,933,881 B2
(45) Date of Patent: Apr. 3, 2018

(54) INDUCTIVE TOUCH MODULES AND INDUCTIVE TOUCH DISPLAY DEVICES AND THE MANUFACTURING METHOD THEREOF

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 342 days.

(21) Appl. No.: 14/646,011

(22) PCT Filed: Mar. 25, 2015

(86) PCT No.: PCT/CN2015/077998
§ 371 (c)(1),
(2) Date: May 19, 2015

(87) PCT Pub. No.: WO2016/149988
PCT Pub. Date: Sep. 29, 2016

(65) Prior Publication Data
US 2017/0045978 A1    Feb. 16, 2017

(30) Foreign Application Priority Data
Mar. 25, 2015 (CN) .......................... 2015 1 0134399

(51) Int. Cl.
*G06F 3/041* (2006.01)
*G06F 3/046* (2006.01)

(52) U.S. Cl.
CPC ............ *G06F 3/0416* (2013.01); *G06F 3/046* (2013.01); *G06F 3/0412* (2013.01); *G06F 2203/04103* (2013.01)

(58) Field of Classification Search
CPC ............ G06F 3/041; G06F 3/046; G06F 2203/04103; G06F 3/0412; G06F 3/0416
See application file for complete search history.

(56) References Cited

U.S. PATENT DOCUMENTS 9,170,699 B2 * 10/2015 Xi .......................... G06F 3/046
9,285,916 B2 *  3/2016 Xi .......................... G06F 3/047
(Continued)

FOREIGN PATENT DOCUMENTS

| CN | 203561977 U | 4/2014 |
| CN | 103941950 A | 7/2014 |
| CN | 103941951 A | 7/2014 |

*Primary Examiner* — Afroza Chowdhury
(74) *Attorney, Agent, or Firm* — Andrew C. Cheng

(57) ABSTRACT

An inductive touch module and an inductive touch display device and the manufacturing method thereof are disclosed. The induction touch module includes: an X-layer of metallic lines, a Y-layer of metallic lines and an electromagnetic induction coil layer stacked together, and the X-layer of metallic lines, the Y-layer of metallic lines, and the electromagnetic induction coil layer are insulated from each other; the X-layer of metallic lines comprises a plurality of X metallic lines arranged along a first direction; the Y-layer of metallic lines comprises a plurality of Y metallic lines arranged along a second direction; the electromagnetic induction coil layer comprises a plurality of electromagnetic induction coils arranged in a matrix; each of the electromagnetic induction coils is of a spiral structure, each of the electromagnetic induction coils connects to one X metallic line and one Y metallic line, and each of the electromagnetic induction coils corresponds to the X metallic line and the Y metallic line one by one. In this way, the number of coils of the electromagnetic induction coils within a specific dimension may be increased so as to enhance the sensibility of the touch module.

8 Claims, 3 Drawing Sheets

(56) References Cited

U.S. PATENT DOCUMENTS

| | | | |
|---|---|---|---|
| 9,575,612 B2* | 2/2017 | Zhang | G06F 3/0416 |
| 2003/0127704 A1* | 7/2003 | Kobayashi | H01F 17/0006 |
| | | | 257/531 |
| 2011/0256437 A1 | 10/2011 | Katsuki et al. | |
| 2012/0313871 A1* | 12/2012 | Tsai | G06F 3/041 |
| | | | 345/173 |
| 2014/0078104 A1* | 3/2014 | Lee | G06F 3/044 |
| | | | 345/174 |
| 2014/0333574 A1* | 11/2014 | Xi | G06F 3/046 |
| | | | 345/174 |
| 2015/0022488 A1 | 1/2015 | Xi et al. | |
| 2015/0212634 A1* | 7/2015 | Pyun | G06F 3/0412 |
| | | | 345/173 |
| 2015/0355758 A1 | 12/2015 | Zhang | |
| 2016/0342246 A1* | 11/2016 | Xu | G06F 9/44 |

* cited by examiner

INDUCTIVE TOUCH MODULES AND INDUCTIVE TOUCH DISPLAY DEVICES AND THE MANUFACTURING METHOD THEREOF

BACKGROUND OF THE INVENTION

1. Field of the Invention

The present disclosure relates to display technology, and more particularly to an inductive touch module and an inductive touch display device and the manufacturing method thereof.

2. Discussion of the Related Art

The electromagnetic induction touch devices usually include an electromagnetic sensing layer, at least one electromagnetic connecting components connecting with the electromagnetic sensing layer, and a location information monitor connecting with the electromagnetic connecting components. When a user touch the electromagnetic sensing layer, magnetic flux of the electromagnetic induction coils has been changed. The change has been transferred to the location information monitor via the connecting component. The location information monitor further calculates the location of the touch points in accordance with the difference of the magnetic flux.

Currently, the electromagnetic coils are usually configured to be U-shaped loop. Thus, the number of the coils is relatively low, and thus the sensing current is smaller.

SUMMARY

In one aspect, an induction touch module includes: an X-layer of metallic lines, a Y-layer of metallic lines and an electromagnetic induction coil layer stacked together, and the X-layer of metallic lines, the Y-layer of metallic lines, and the electromagnetic induction coil layer are insulated from each other; the X-layer of metallic lines includes a plurality of X metallic lines arranged along a first direction; the Y-layer of metallic lines includes a plurality of Y metallic lines arranged along a second direction; the electromagnetic induction coil layer includes a plurality of electromagnetic induction coils arranged in a matrix; each of the electromagnetic induction coils is of a spiral structure, each of the electromagnetic induction coils connects to one X metallic line and one Y metallic line, and each of the electromagnetic induction coils corresponds to the X metallic line and the Y metallic line one by one; the first direction is vertical to the second direction, and both of the X metallic line and the Y metallic line pass through a central position of the electromagnetic induction coils of the spiral structure; and a first insulation layer and a second insulation layer, the first insulation layer is arranged between the X-layer of metallic lines and the Y-layer of metallic lines, and the second insulation layer is arranged between the Y-layer of metallic lines and the electromagnetic induction coil layer.

Wherein one of the beginning and the ending electromagnetic induction coils passes through a via hole of the first insulation layer and the second insulation layer to electrically connect with the X metallic lines, and the other one of the beginning and the ending electromagnetic induction coils passes through a via hole of the second insulation layer to electrically connect with the Y metallic lines.

Wherein the electromagnetic induction coils is made by transparent conductive materials.

Wherein the transparent conductive materials is Indium Tin Oxide (ITO).

In another aspect, an inductive touch display device includes: a substrate, and an X-layer of metallic lines, a Y-layer of metallic lines, and an electromagnetic induction coil layer insulated from each other are arranged on the same side of the substrate, wherein: the X-layer of metallic lines includes a plurality of X metallic lines arranged along a first direction; the Y-layer of metallic lines includes a plurality of Y metallic lines arranged along a second direction; the electromagnetic induction coil layer includes a plurality of electromagnetic induction coils arranged in a matrix; and each of the electromagnetic induction coils is of a spiral structure, each of the electromagnetic induction coils connects to one X metallic line and one Y metallic line, and each of the electromagnetic induction coils corresponds to the X metallic line and the Y metallic line one by one.

Wherein the substrate is a color-film substrate, the substrate includes a black matrix, the X metallic lines and the Y metallic lines are arranged above the black matrix, and ends of the X metallic lines and the Y metallic lines have not exceeded the black matrix, and the electromagnetic induction coils are made by Indium Tin Oxide (ITO).

Wherein the inductive touch display device further includes a first insulation layer and a second insulation layer, the first insulation layer is arranged between the X-layer of metallic lines and the Y-layer of metallic lines, and the second insulation layer is arranged between the Y-layer of metallic lines and the electromagnetic induction coil layer, the first insulation layer insulates the X-layer of metallic lines from the Y-layer of metallic lines, the second insulation layer insulates the Y-layer of metallic lines from the electromagnetic induction coil layer, the first insulation layer and the second insulation layer are arranged above the black matrix and ends of the first insulation layer and the second insulation layer have not exceeded the black matrix.

Wherein one of the beginning and the ending electromagnetic induction coils passes through a via hole of the first insulation layer and the second insulation layer so as to electrically connect with the X metallic lines, and the other one of the beginning and the ending electromagnetic induction coils passes through a via hole of the second insulation layer so as to electrically connect with the Y metallic lines.

Wherein the electromagnetic induction coils is made by transparent conductive materials.

Wherein the transparent conductive materials is Indium Tin Oxide (ITO).

In another aspect, a manufacturing method of inductive touch display devices includes: providing a substrate; disposing a first metallic thin-film on the substrate, and exposing, developing, etching, and stripping the first metallic thin-film so as to form an X-layer of metallic lines, and the X-layer of metallic lines includes a plurality of X metallic lines arranged along a first direction; disposing a second metallic thin-film on the substrate, and exposing, developing, etching, and stripping the second metallic thin-film so as to form an Y-layer of metallic lines, and the Y-layer of metallic lines includes a plurality of Y metallic lines arranged along a second direction; disposing a transparent conductive thin film on the Y-layer of metallic lines, and exposing, developing, etching, and striping the transparent conductive thin film to form an electromagnetic induction coil layer having a plurality of electromagnetic induction coils of spiral structure; and connecting each of the electromagnetic induction coils to one X metallic line and one Y metallic line such that each of the electromagnetic induction coils corresponds to the X metallic line and the Y metallic line one by one.

Wherein the substrate is a color-film substrate, the substrate includes a glass substrate and a black matrix arranged on the glass substrate, the method further includes a step executed before disposing the first metallic thin-film on the substrate, and the step includes: coating, exposing, and developing the glass substrate to form the black matrix, and ends of the X metallic lines and the Y metallic lines have not exceeded the black matrix; and the method further includes a step executed before disposing the second metallic thin-film on the substrate, and the step includes: forming a first insulation layer on the X-layer of metallic lines, and the first insulation layer is arranged on the black matrix, and ends of the first insulation layer have not exceeded the black matrix;

the method further includes a step executed before disposing the transparent conductive thin film on the Y-layer of metallic lines, and the step includes: forming a second insulation layer on the Y-layer of metallic lines, and the second insulation layer is arranged on the black matrix, and ends of the second insulation layer have not exceeded the black matrix.

Wherein the step of connecting each of the electromagnetic induction coils to one X metallic line and one Y metallic line further includes: one of the beginning and the ending electromagnetic induction coils passes through a via hole of the first insulation layer and the second insulation layer to electrically connect with the X metallic lines, and the other one of the beginning and the ending electromagnetic induction coils passes through a via hole of the second insulation layer to electrically connect with the Y metallic lines.

Wherein the electromagnetic induction coils is made by transparent conductive materials.

Wherein the transparent conductive materials is Indium Tin Oxide (ITO).

In view of the above, the electromagnetic induction coils are configured to be spiral-shaped to increase the number of the coils within a specific dimension. As such, the sensing current is increased.

DETAILED DESCRIPTION OF THE EMBODIMENTS

Embodiments of the invention will now be described more fully hereinafter with reference to the accompanying drawings, in which embodiments of the invention are shown.

Figure 1:
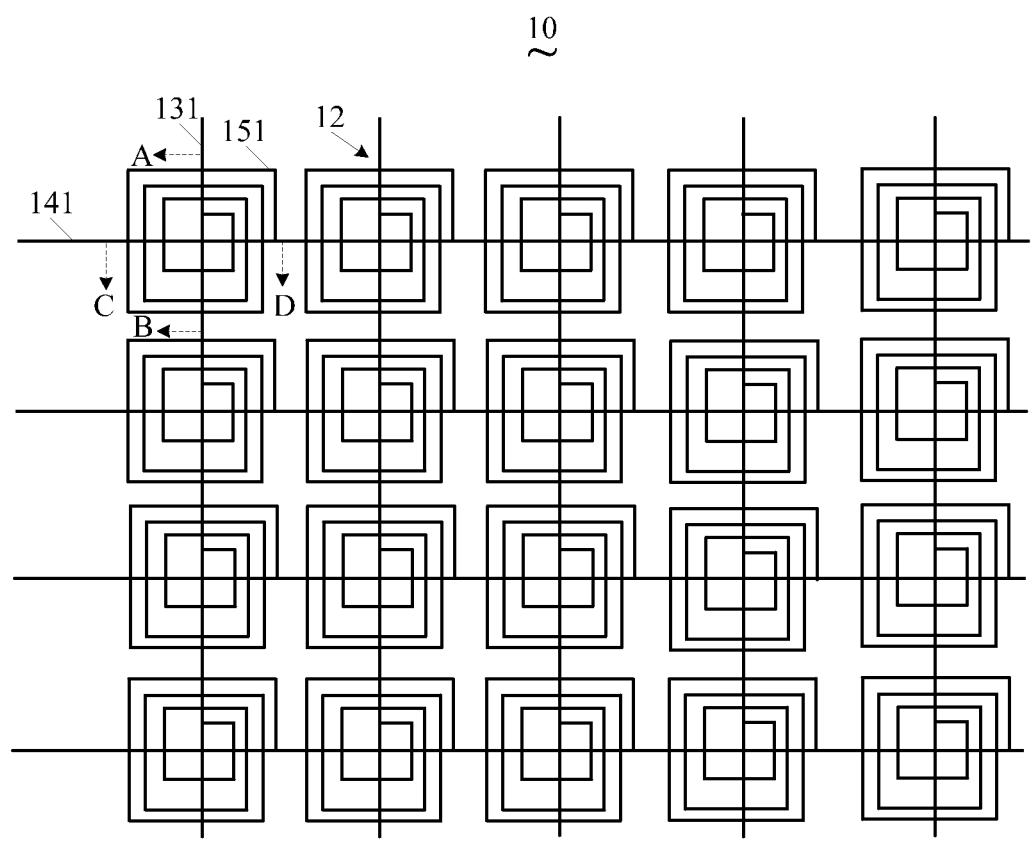
FIG. 1 is a schematic view of the inductive touch display device in accordance with one embodiment.
Figure 2:
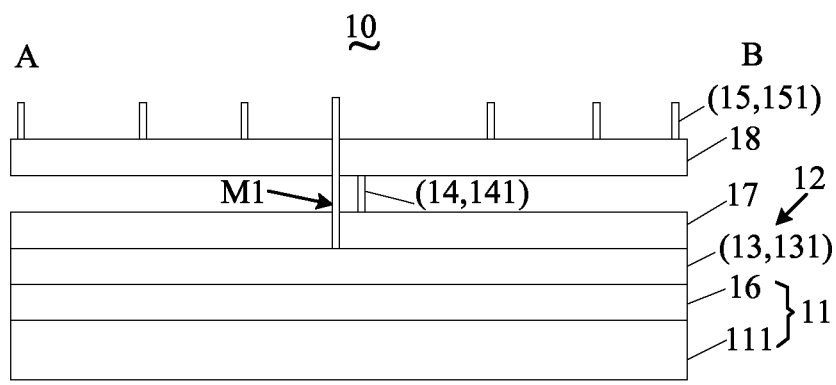
FIG. 2 is a cross-sectional view of the inductive touch display device of FIG. 1 along the dashed line "AB".
Figure 3:
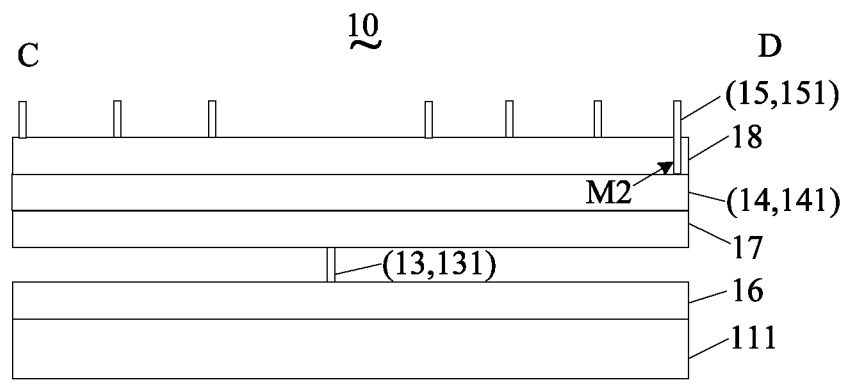
FIG. 3 is a cross-sectional view of the inductive touch display device of FIG. 1 along the dashed line "CD".

FIG. 1 is a schematic view of the inductive touch display device in accordance with one embodiment. FIG. 2 is a cross-sectional view of the inductive touch display device of FIG. 1 along the dashed line "AB". FIG. 3 is a cross-sectional view of the inductive touch display device of FIG. 1 along the dashed line "CD". As shown in FIGS. 1-3, the inductive touch display device 10 includes a substrate 11 and an inductive touch module 12 arranged on the substrate 11.

The inductive touch module 12 includes an X-layer of metallic lines 13, a Y-layer of metallic lines 14, and an electromagnetic induction coil layer 15 stacked together. The X-layer of metallic lines 13, the Y-layer of metallic lines 14, and the electromagnetic induction coil layer 15 are insulated from each other and are arranged on the same side of the substrate 11 in turn.

The X-layer of metallic lines 13 includes a plurality of X metallic lines 131 arranged along a first direction. The Y-layer of metallic lines 14 includes a plurality of Y metallic lines 141 arranged along a second direction. The electromagnetic induction coil layer 15 includes a plurality of electromagnetic induction coils 151 arranged in a matrix. Each of the electromagnetic induction coils 151 is of a spiral structure. Each of the electromagnetic induction coils 151 connects to one X metallic line 131 and one Y metallic line 141. Each of the electromagnetic induction coils 151 corresponds to the X metallic line 131 and the Y metallic line 141 one by one.

In an example, the first direction is vertical to the second direction. In addition, as shown in FIG. 1, both of the X metallic line 131 and the Y metallic line 141 pass through a central position of the electromagnetic induction coils 151 of the spiral structure.

In another example, the electromagnetic induction coils 151 may be a circular spiral-structure or spiral-structure of other shapes, in addition to the rectangular spiral-structure as shown in FIG. 1.

The substrate 11 may be a color-film substrate. The substrate 11 includes a glass substrate 111 and a black matrix 16 arranged on the glass substrate 111. The X metallic lines 131 and the Y metallic lines 141 are arranged above the black matrix 16, and ends of the X metallic lines 131 and the Y metallic lines 141 have not exceeded the black matrix 16. The electromagnetic induction coils 151 may be made by Indium Tin Oxide (ITO).

The inductive touch display device 10 further includes a first insulation layer 17 and a second insulation layer 18. The first insulation layer 17 is arranged between the X-layer of metallic lines 13 and the Y-layer of metallic lines 14. The second insulation layer 18 is arranged between the Y-layer of metallic lines 14 and the electromagnetic induction coil layer 15. The first insulation layer 17 may insulate the X-layer of metallic lines 13 from the Y-layer of metallic lines 14. The second insulation layer 18 may insulate the Y-layer of metallic lines 14 and the electromagnetic induction coil layer 15. The first insulation layer 17 and the second insulation layer 18 are arranged above the black matrix 16 and ends of the first insulation layer 17 and the second insulation layer 18 have not exceeded the black matrix 16. In addition, the first insulation layer 17 and the second insulation layer 18 may be made by the same organic-insulation material, such as rubber, resin, shellac, cotton bond, linen, silk, rayon tube, and so on. In another example, the first insulation layer 17 and the second insulation layer 18 may be made by different kinds of insulation material.

One of the beginning and the ending electromagnetic induction coil 151 passes through a via hole (M1) of the first insulation layer 17 and the second insulation layer 18 so as to electrically connect with the X metallic lines 131. The other one of the beginning and the ending electromagnetic induction coil 151 passes through a via hole (M2) of the second insulation layer 18 so as to connect with the Y metallic lines 141.

In an example, the inductive touch display device may be apply to the single-touch IPS and the FPS display panel. In real scenario, the inductive touch display device may operate cooperatively with one electromagnetic pen. The X metallic lines 131 and the Y metallic lines 141 may respectively represent X and Y signal-position lines. The ends of the X metallic lines 131 and the Y metallic lines 141 that are not connected to the electromagnetic induction coils 151 are connected to the location information monitor (not shown).

The electromagnetic induction coils 151 may be an inductive touch unit. When the electromagnetic pen touches the electromagnetic induction coils 151, a sensing current may be generated due to the difference of magnetic flux of the electromagnetic induction coils 151. The sensing current results in that two ends of the X metallic lines 131 and the Y metallic lines 141 generate pulse signals with opposite phases. The location information monitor detects the signals at two ends of the X metallic lines 131 and the Y metallic lines 141 so as to position the location of touch points.

In view of the above, the planar spiral-structure of the electromagnetic induction coils 151 increases the number of the coils so as to increase the sensing current. In addition, the sensibility of the inductive touch display device is enhanced.

Figure 4:
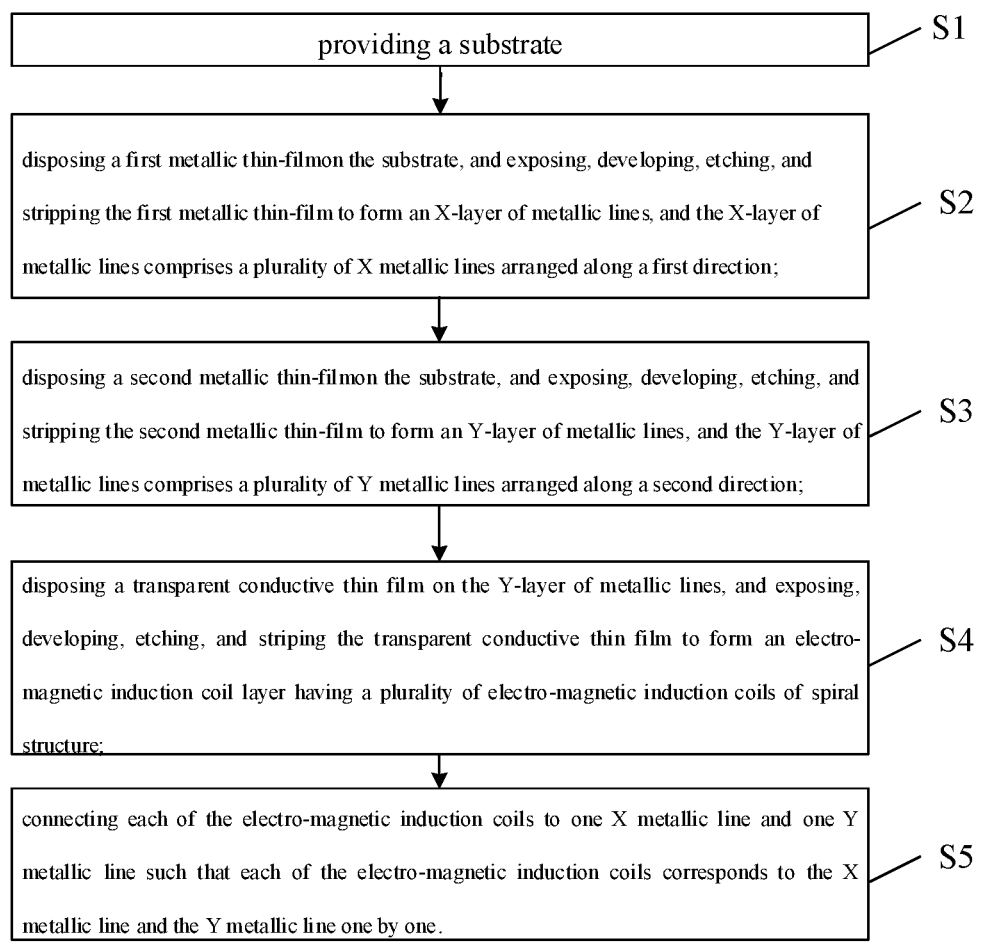
FIG. 4 is a flowchart of the manufacturing method of the inductive touch display device.

FIG. 4 is a flowchart of the manufacturing method of the inductive touch display device. The method includes the following steps. In step S1, a substrate is provided. The substrate includes a color-film substrate. The substrate includes a glass substrate and a black matrix arranged on the glass substrate. Specifically, the glass substrate is provided and then the black matrix is formed by coating and exposing the glass substrate and applying a developing process toward the glass substrate.

In step S2, a first metallic thin-film is deposed on the substrate. Afterward, the first metallic thin-film is exposed, developed, etched, and striped so as to form the X-layer of metallic lines. The X-layer of metallic lines includes a plurality of X metallic lines arranged along a first direction. The ends of the X metallic lines have not exceeded the black matrix.

In step S3, a second metallic thin-film is deposed on the X-layer of metallic lines. Afterward, the second metallic thin-film is exposed, developed, etched, and striped so as to form the Y-layer of metallic lines. The Y-layer of metallic lines are insulated from the X-layer of metallic lines. The Y-layer of metallic lines includes a plurality of Y metallic lines arranged along a second direction. The ends of the Y metallic lines have not exceeded the black matrix. In an example, the first direction is vertical to the second direction.

In an example, a step of forming a first insulation layer on the X-layer of metallic lines is executed before step S3. The first insulation layer is arranged on the black matrix, and the ends of the first insulation layer have not exceeded the black matrix.

In step S4, a transparent conductive thin film is deposed on the Y-layer of metallic lines. The transparent conductive thin film is exposed, developed, etched, and stripped so as to form the electromagnetic induction coil layer having a plurality of electromagnetic induction coils of spiral structure.

In an example, a step of forming a second insulation layer on the Y-layer of metallic lines is executed before step S4. The second insulation layer is arranged on the black matrix, and the ends of the second insulation layer have not exceeded the black matrix.

In step S5, each of the electromagnetic induction coils has been connected to one X metallic line and one Y metallic line such that each of the electromagnetic induction coils corresponds to the X metallic line and the Y metallic line one by one.

Specifically, one of the beginning and the ending electromagnetic induction coil 151 passes through a via hole of the first insulation layer and the second insulation layer so as to electrically connect with the X metallic lines. The other one of the beginning and the ending electromagnetic induction coil passes through a via hole of the second insulation layer so as to connect with the Y metallic lines.

In view of the above, the planar spiral-structure of the electromagnetic induction coils 151 increases the number of the coils so as to increase the sensing current. In addition, the sensibility of the inductive touch display device is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An inductive touch display device, comprising:
   a substrate, and an X-layer of metallic lines, a Y-layer of metallic lines, and an electromagnetic induction coil layer insulated from each other are arranged on the same side of the substrate, wherein:
   the X-layer of metallic lines comprises a plurality of X metallic lines arranged along a first direction;
   the Y-layer of metallic lines comprises a plurality of Y metallic lines arranged along a second direction;
   the electromagnetic induction coil layer comprises a plurality of electromagnetic induction coils arranged in a matrix; and
   each of the electromagnetic induction coils is of a spiral structure, each of the electromagnetic induction coils connects to one X metallic line and one Y metallic line, and each of the electromagnetic induction coils corresponds to the X metallic line and the Y metallic line one by one;
   wherein the substrate is a color-film substrate, the substrate comprises a black matrix, the X metallic lines and the Y metallic lines are arranged above the black matrix, and ends of the X metallic lines and the Y metallic lines have not exceeded the black matrix, and the electromagnetic induction coils are made by Indium Tin Oxide (ITO);
   wherein the inductive touch display device further comprises a first insulation layer and a second insulation layer, the first insulation layer is arranged between the X-layer of metallic lines and the Y-layer of metallic lines, and the second insulation layer is arranged between the Y-layer of metallic lines and the electromagnetic induction coil layer, the first insulation layer insulates the X-layer of metallic lines from the Y-layer of metallic lines, the second insulation layer insulates the Y-layer of metallic lines from the electromagnetic induction coil layer, the first insulation layer and the second insulation layer are arranged above the black matrix and ends of the first insulation layer and the second insulation layer have not exceeded the black matrix.

2. The inductive touch display device as claimed in claim 1, wherein one of the beginning and the ending electromagnetic induction coils passes through a via hole of the first insulation layer and the second insulation layer so as to electrically connect with the X metallic lines, and the other one of the beginning and the ending electromagnetic induction coils passes through a via hole of the second insulation layer so as to electrically connect with the Y metallic lines.

3. The inductive touch display device as claimed in claim 1, wherein the electromagnetic induction coils is made by transparent conductive materials.

4. The inductive touch display device as claimed in claim 3, wherein the transparent conductive materials is Indium Tin Oxide (ITO).

5. A manufacturing method of inductive touch display devices, comprising:
   providing a substrate;
   disposing a first metallic thin-film on the substrate, and exposing, developing, etching, and stripping the first metallic thin-film so as to form an X-layer of metallic lines, and the X-layer of metallic lines comprises a plurality of X metallic lines arranged along a first direction;
   disposing a second metallic thin-film on the substrate, and exposing, developing, etching, and stripping the second metallic thin-film so as to form an Y-layer of metallic lines, and the P-layer of metallic lines comprises a plurality of Y metallic lines arranged along a second direction;
   disposing a transparent conductive thin film on the Y-layer of metallic lines, and exposing, developing, etching, and striping the transparent conductive thin film to form an electromagnetic induction coil layer having a plurality of electromagnetic induction coils of spiral structure; and
   connecting each of the electromagnetic induction coils to one X metallic line and one Y metallic line such that each of the electromagnetic induction coils corresponds to the X metallic line and the Y metallic line one by one;
   wherein the substrate is a color-film substrate, the substrate comprises a glass substrate and a black matrix arranged on the glass substrate, the method further comprises a step executed before disposing the first metallic thin-film on the substrate, and the step comprises:
   coating, exposing, and developing the glass substrate to form the black matrix, and ends of the X metallic lines and the Y metallic lines have not exceeded the black matrix; and
   the method further comprises a step executed before disposing the second metallic thin-film on the substrate, and the step comprises:
   forming a first insulation layer on the X-layer of metallic lines, and the first insulation layer is arranged on the black matrix, and ends of the first insulation layer have not exceeded the black matrix;
   the method further comprises a step executed before disposing the transparent conductive thin film on the Y-layer of metallic lines, and the step comprises:
   forming a second insulation layer on the Y-layer of metallic lines, and the second insulation layer is arranged on the black matrix, and ends of the second insulation layer have not exceeded the black matrix.

6. The manufacturing method as claimed in claim 5, wherein the step of connecting each of the electromagnetic induction coils to one X metallic line and one Y metallic line further comprises:
   one of the beginning and the ending electromagnetic induction coils passes through a via hole of the first insulation layer and the second insulation layer to electrically connect with the X metallic lines, and the other one of the beginning and the ending electromagnetic induction coils passes through a via hole of the second insulation layer to electrically connect with the Y metallic lines.

7. The manufacturing method as claimed in claim 5, wherein the electromagnetic induction coils is made by transparent conductive materials.

8. The manufacturing method as claimed in claim 7, wherein the transparent conductive materials is Indium Tin Oxide (ITO).

* * * * *